(12) United States Patent
De Winter

(10) Patent No.: US 7,515,821 B2
(45) Date of Patent: Apr. 7, 2009

(54) RECTILINEAR GUIDE WHICH CAN BE SET WITHOUT PLAY

(75) Inventor: André De Winter, Leun (DE)

(73) Assignee: Leica Camera AG, Solms (DE)

( * ) Notice: Subject to any disclaimer, the term of this patent is extended or adjusted under 35 U.S.C. 154(b) by 321 days.

(21) Appl. No.: 11/439,150

(22) Filed: May 24, 2006

(65) Prior Publication Data

US 2006/0269269 A1 Nov. 30, 2006

(30) Foreign Application Priority Data

May 24, 2005 (DE) .................. 10 2005 023 921

(51) Int. Cl.
*G03B 13/00* (2006.01)
(52) U.S. Cl. ..................................... 396/144
(58) Field of Classification Search ............... 396/60, 396/144, 90–91; 296/303, 315; 83/767; 49/324, 348, 352; 369/13.37; 359/828, 811, 359/813, 814, 819, 821, 822, 823, 824, 825, 359/826, 827
See application file for complete search history.

(56) References Cited

U.S. PATENT DOCUMENTS

| 3,590,715 A | * | 7/1971 | Schops ..................... 396/510 |
| 4,671,764 A | * | 6/1987 | Hehl .......................... 425/595 |
| 4,690,505 A | * | 9/1987 | Iizuka et al. ............... 359/822 |
| 5,020,892 A | * | 6/1991 | Glover et al. .............. 359/399 |

FOREIGN PATENT DOCUMENTS

| DE | 274 287 A1 | 12/1989 |
| DE | 198 04 472 C1 | 8/1999 |
| DE | 103 09 195 A1 | 9/2004 |

* cited by examiner

*Primary Examiner*—Reena Aurora
(74) *Attorney, Agent, or Firm*—Foley & Lardner LLP

(57) ABSTRACT

An objective adjusting device has a stationary housing, an adjusting ring with an internal thread and a tube, with an external thread, that is guided rectilinearly in an axial direction and carries optical active elements. The adjusting ring is rotatably supported in the housing, and the tube has at least one axially parallel opening with mutually parallel sliding surfaces in which a guide element connected to the housing engages. The guide element is designed as a lug with a sliding head which is adapted in width to the opening and is provided with a slot, of settable slot width, running in a radial direction.

9 Claims, 2 Drawing Sheets

RECTILINEAR GUIDE WHICH CAN BE SET WITHOUT PLAY

CROSS-REFERENCE TO RELATED PATENT APPLICATIONS

The right of foreign priority is claimed under 35 U.S.C. § 119 based on Federal Republic of Germany Application No. 10 2005 023 921.8, filed May 24, 2005, the entire contents of which, including the specification, drawings, claims and abstract, are incorporated herein by reference.

BACKGROUND OF THE INVENTION

The invention relates to an objective adjusting device having a stationary housing, an adjusting ring with an internal thread and a tube, with an external thread, that is guided rectilinearly in an axial direction and carries optical active elements, the adjusting ring being rotatably supported in the housing, and the tube having at least one axially parallel opening with mutually parallel sliding surfaces in which a guide element connected to the housing engages.

Such objective adjusting devices are used for focusing photographic objectives. It is known for this purpose to displace the focusing element in an axial direction along the optical axis of the objective. During the displacement, rotations of the lens elements are preferably to be avoided in order to exclude influences of centering errors which may be present. The rotary movement of a focusing ring is converted into a precise axial movement via a rectilinear guide running parallel to the optical axis and secured in terms of rotation. The axial movement of the focusing optics must be free from radial play in the event of strict requirements placed on optical accuracy. For this reason, but also in order to be able to implement large leads and thus large axial travel, the thread is designed as a helical thread. The rectilinear guide must run in the exactly axially parallel fashion in order to ensure that no overdetermination, which would result in a sluggishness of the axial movement, comes about in conjunction with the positively driven tube of this helical thread. The freedom from play of the guide element must likewise be ensured.

DE 198 04 472 C1 discloses a play-free rectilinear guide in a cylindrical mount in which the stationary guide track running parallel to the optical axis has on one side a stop strip, resiliently supported by a wave spring, as a running surface for the cylindrical guide element. Because of the pressure acting through the wave spring only on one side, the guide element, which is designed in a solid fashion as a cylindrical pin which can be screwed in, runs along the guide track under a permanent load on one side during the axial displacement movement. In the course of time, the biasing acting on the cylindrical pin varies owing to wear of the guide track and to fatigue of the wave spring, something which has a negative effect on the freedom from play.

DD 274 287 A1 discloses a rectilinear guide which comprises a bent guide part which engages in a guide groove running parallel to the optical axis, and is anchored on the body of a mount by two screws. In the case of this rectilinear guide, the guide part must be precisely fitted in the region of its axially parallel extent to the width of the guide groove, in order to avoid inverting images and inaccuracies in focusing. Very stringent requirements are to be placed on the parallelism of the guide part relative to the guide groove and to the optical axis, in order to avoid torsional stresses and uneven running of the tube supporting the optical active elements over the axial travel provided.

SUMMARY OF THE INVENTION

It is therefore an object of the invention to provide an objective adjusting device having a rectilinear guide which can be set without play, can be adjusted easily during fabrication, prevents overdetermination of the components to be tuned to one another, exhibits constant ease of movement over the lifetime, and is subject only to minimum wear.

According to embodiments of the invention, the guide element is designed as a lug with a sliding head which is adapted in width to the opening and is provided with a slot, of settable slot width, running in a radial direction. It is possible in this way to dispense with fabricating the guide element true to size, and with an expensive truing to the width of the axially parallel opening. The slot width is set optimally to the width of the opening at the end of the assembly of the objective adjusting device.

For the purpose of bearing uniformly against the parallel sliding surfaces of the axially parallel opening, the lug is designed in the shape of a tongue and with a sliding head of augmented cross section.

The slot runs through the sliding head into the region of the lug in order to be able to set the slot width more effectively and with ease of movement.

For the purpose of setting the slot width, the slot running in the sliding head is provided with a thread in a first section running in an axial direction, and is provided with a wedge-shaped spreading surface in a subsequent second section. A setscrew with a conical tip is settably inserted into the thread, which is advantageously pressed against the wedge-shaped spreading surface by careful turning during mounting until the slot is opened so far that the guide element is guided rectilinearly in the opening in a fashion free from play. The freedom from play can be checked by moving the guide element to and fro once or repeatedly in the rectilinear guide, and a setscrew can subsequently be fixed in its screwed-in position with safety lacquer. Alternatively, the setscrew can be pressed against the wedge-shaped spreading surface with a defined torque. It is possible in this way to set an optimum value between freedom of play, on the one hand, and frictional force owing to the pressure of the sliding head sides against the parallel sliding surfaces of the axially parallel opening, on the other hand.

In an advantageous refinement, a further slot is provided in the lug in a fashion parallel to the settable slot. The side of the sliding head assigned to this further slot acts compliantly or slightly resiliently in order to be able to compensate possible unevennesses of the parallel sliding surface.

So that the lug can be fabricated in a separate operation and can be exchanged individually during servicing without the need to dismantle the housing, it is screwed on the housing with its nonslotted part. Of course, it is also possible to conceive embodiments in which the lug is integrally formed on part of the housing, in order to improve fabrication.

In a further advantageous embodiment, there is provided in the tube a second opening which is diametrically opposite the first opening and in which there engages a further guide element, which is permanently connected to the housing and is fabricated from elastic plastic. This elastic guide element is likewise slotted in an axial direction and has an oversize by comparison with the width of the opening which is less than the slot width. In this way, on the one hand biasing can be produced under which the guide element can be guided rectilinearly in a resilient fashion in the opening and, on the other hand, the two parts of the guide element produced by the axial slot per se can compensate possible unevennesses of the sliding surfaces or fluctuations in the width of the opening. Overdetermination in the moving tube is reliably avoided. Manufacturing inaccuracies can be more effectively tolerated.

Better guidance properties of the further guide element may be achieved when the guide element is designed as a tongue-shaped lug with a sliding head of augmented cross section. Polyoxymethylene (POM) has proved to be particularly advantageous when selecting materials, since the self-lubricating property renders additional lubricants superfluous.

In a particularly advantageous embodiment, the slot runs through the sliding head into the region of the lug. The resilient action is improved by these measures.

Further objects, features and advantages of the present invention will become apparent from the detailed description of preferred embodiments that follows, when considered together with the accompanying figures of drawing.

BRIEF DESCRIPTION OF THE DRAWINGS

Exemplary embodiments of an objective adjusting device according to the invention are illustrated in the drawings diagrammatically and will be explained below in more detail with reference to the figures, in which.

DETAILED DESCRIPTION OF THE PREFERRED EMBODIMENTS

Figures 1, 2:
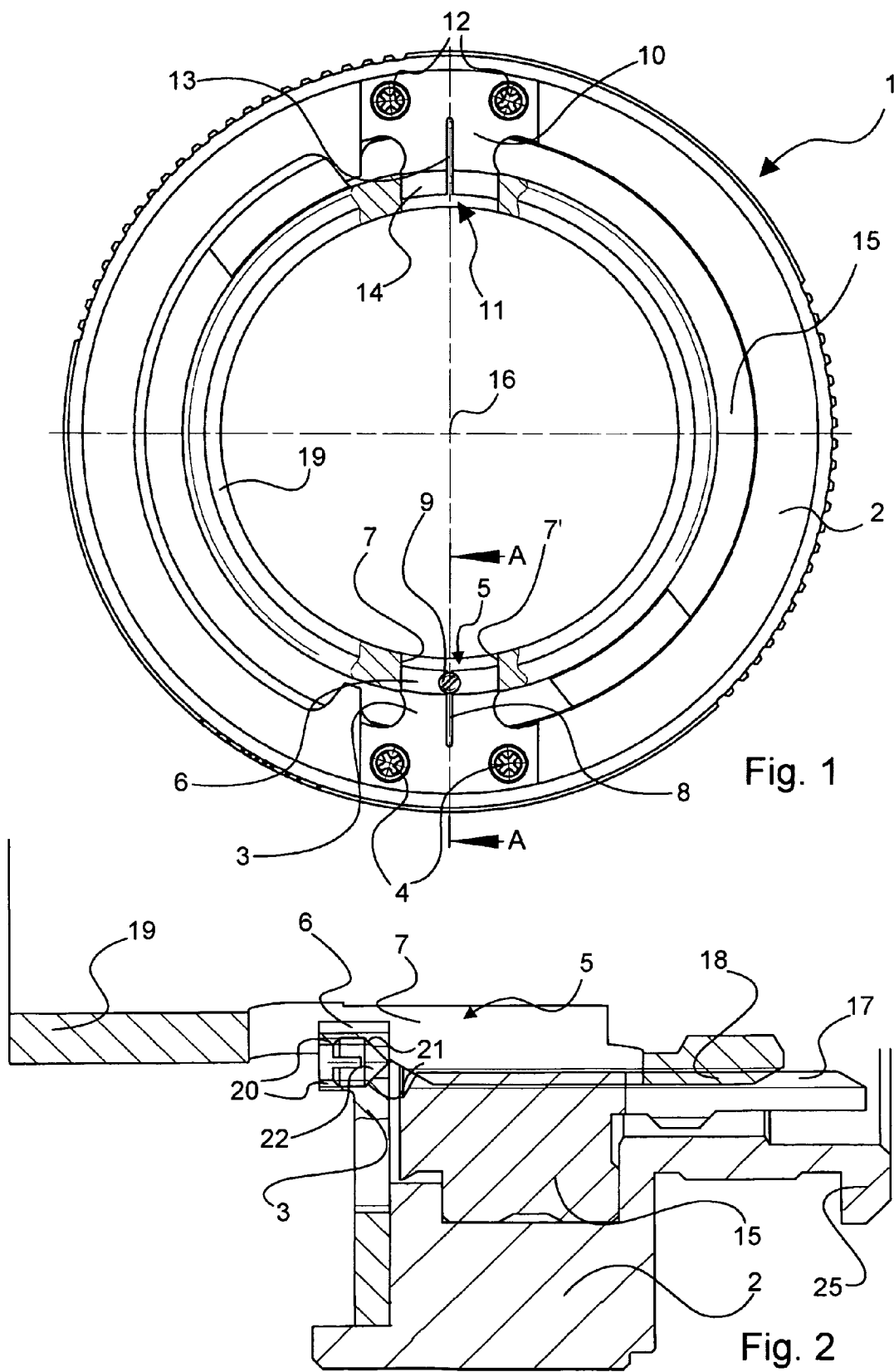
FIG. 1 shows a front view with sectional illustrations in the region of guide elements.
FIG. 2 shows a sectional illustration along the line A-A from FIG. 1.

An objective adjusting device 1 having a stationary housing 2 is illustrated in a front view in FIG. 1. A settable guide element 3 is designed as a lug and fastened on the housing 2 with the aid of screws 4. The guide element 3 engages in the opening 5 in a tube 19 with the aid of a sliding head 6 adapted in width to a first axially parallel opening 5. The sliding head 6 bears laterally against sliding surfaces 7 and 7' of the opening 5, and is provided with a slot 8, of settable slot width, running in a radial direction as far as into the region of the lug. The width of the slot is set via a setscrew 9.

Illustrated diametrically opposite is an elastic guide element 10 which engages in an axially parallel second opening 11 in the tube 19, and is fastened on the housing 2 with the aid of two screws 12. The width of the second guide element 10 exhibits by comparison with the width of the second opening 11 an oversize which is less than the slot width of a resilient slot 13, running in a radial direction, in the guide element 10. In this way, the head region 14 of the elastic guide element 10 lies in the second opening 11 under spring tension.

An adjusting ring 15 is supported rotatably about the optical axis 16 in the housing 2. The mode of operation of the adjusting ring 15 is to be gathered from FIG. 2.

The sectional illustration in FIG. 2 along the line A-A from FIG. 1 shows the stationary housing 2, which can be fitted on a camera (not illustrated in more detail) with the aid of a schematically illustrated bayonet 25. The adjusting ring 15 is inserted in a rotatably supported fashion in the housing 2 and has an internal thread 17. The internal thread 17 is designed as a helical thread and, together with the external thread 18 of the tube 19, forms a so-called worm thread. The lead of the worm thread is adapted in this case to the required focal path, and to be larger the larger the focal path (axial travel) to be covered per rotary movement is intended to be. As soon as the adjusting ring 15 is set into rotary movement, the tube 19, which supports an objective head (not further illustrated), can move only in an axial direction because of the guide element 3, which is fixed on the housing 2 and engages in the axially parallel opening 5. The sliding head 6 of augmented design bears laterally against the sliding surface 7, and must convert into an axial displacement of the tube 19 the force produced by the rotary movement of the adjusting ring 15 and initially brought about via the worm thread 17, 18 on the tube 19, and thus the sliding surfaces 7, 7' of the axially parallel opening 5 against the guide element 3. In order to avoid instances of sluggishness or even permanent damage to the guide element 3, the cross section of the sliding head 6 in an axial direction must therefore be greater for the purpose of absorbing or converting this force the greater the lead of the worm thread 17, 18. The sliding head 6 of augmented design is provided with a thread 20 in a first section running in an axial direction, and a wedge-shaped spreading surface 21 is provided in a subsequent second section. The setscrew 9 is settably inserted into the thread 20, and has a conical tip 22 in the region of the spreading surface 21.

Figure 3:
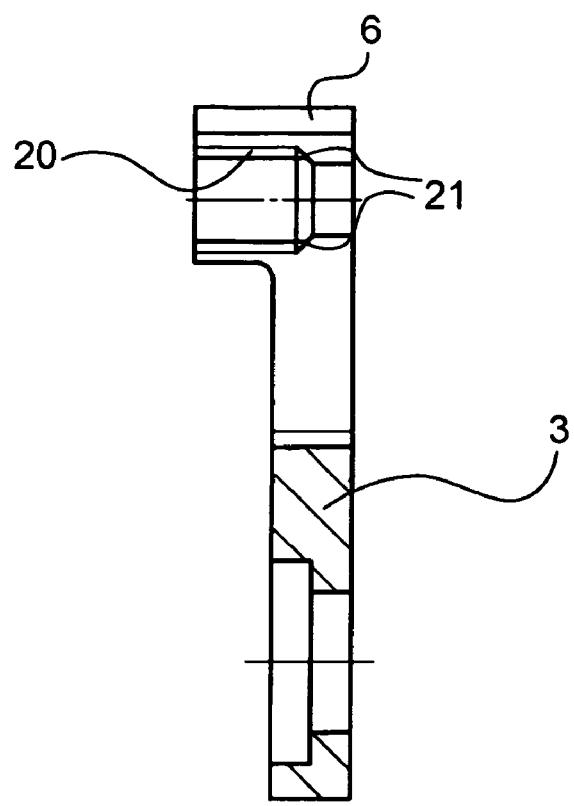
FIG. 3 shows an enlarged illustration of a settable guide element without a setscrew.

FIG. 3 shows an enlarged sectional illustration of a settable guide element 3 for the purpose of explanation. The thread 20 is illustrated in the first section, running in an axial direction, of the sliding head 6 without a setscrew. The wedge-shaped spreading surface 21 is located in the second section following thereupon.

Figure 4:
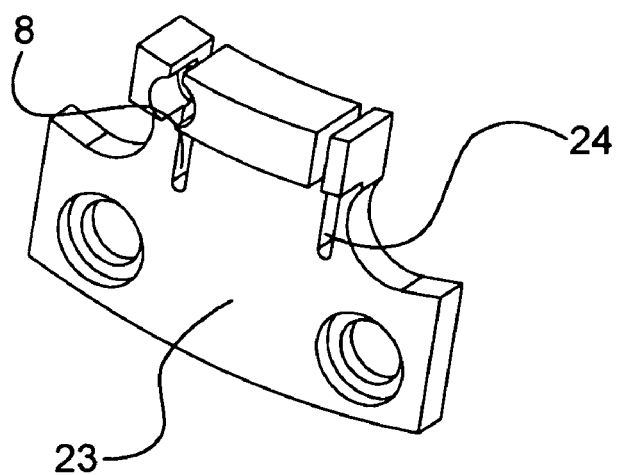
FIG. 4 shows a perspective illustration of an embodiment of a guide element with a further resilient slotted element.

FIG. 4 shows a perspective illustration of an embodiment of a guide element 23 with a slot of settable slot width 8 whose configuration corresponds to that described above, and a second slot 24 running parallel thereto. Owing to this measure, the guide element 23 is capable of resiliently compensating inaccuracies in the parallelism of axially parallel sliding surfaces.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined with reference to the claims appended hereto and that the claims encompass all embodiments of the invention, including equivalents.

List of Reference Numerals

1 Objective adjusting device
2 Housing
3 Settable guide element
4 Screws for fastening the settable guide element
5 First axially parallel opening
6 Sliding head
7, 7' Sliding surfaces
8 Slot of settable slot width
9 Setscrew
10 Elastic guide element
11 Second axially parallel opening
12 Screws for fastening the elastic guide element
13 Resilient slot
14 Head region of the elastic guide element 15 Adjusting ring
16 Optical axis
17 Internal thread of the adjusting ring
18 External thread of the tube
19 Tube
20 Thread
21 Spreading surface
22 Conical tip
23 Alternative guide element
24 Second slot
25 Bayonet

What is claimed is:

1. An objective adjusting device comprising:
    a stationary housing;
    an adjusting ring with an internal thread; and
    a tube, with an external thread, that is guided rectilinearly in an axial direction and carries optical active elements;
    the adjusting ring being rotatably supported in the housing; and
    the tube having at least one axially parallel opening with mutually parallel sliding surfaces in which a guide element connected to the housing engages, wherein the guide element comprises a lug with a sliding head which is adapted in width to the opening and is provided with a slot, of settable slot width, running in a radial direction.

2. An objective adjusting device according to claim 1, wherein the lug is in a shape of a tongue with a sliding head of augmented cross section.

3. An objective adjusting device according to claim 1, wherein the slot runs through the sliding head into a region of the lug.

4. An objective adjusting device according to claim 1, wherein for a purpose of setting the slot width the slot is provided with a thread in a first section running in an axial direction, and is provided with a wedge-shaped spreading surface in a subsequent second section, a setscrew with a conical tip being settably inserted into the thread.

5. An objective adjusting device according to claim 1, wherein a further slot is provided in the lug in a fashion parallel to the settable slot.

6. An objective adjusting device according to claim 1, wherein the lug is screwed on the housing via a nonslotted part.

7. An objective adjusting device according to claim 1, wherein there is provided in the tube a second opening which is diametrically opposite the axially parallel opening and in which there engages a further guide element, which is connected to the housing, is fabricated from elastic plastic, is slotted by a slot in a radial direction; and has an oversize by comparison with a width of the second opening which oversize is less than a slot width of the slot of the further guide element.

8. An objective adjusting device according to claim 7, wherein the further guide element comprises a tongue-shaped lug with a sliding head of augmented cross section.

9. An objective adjusting device according to claim 8, wherein the slot of the further guide element runs through the sliding head into a region of the lug.

* * * * *